April 15, 1941.  M. A. PACKARD ET AL  2,238,448
METHOD AND MEANS OF RECOVERING METALLIFEROUS VALUES
Filed July 15, 1939
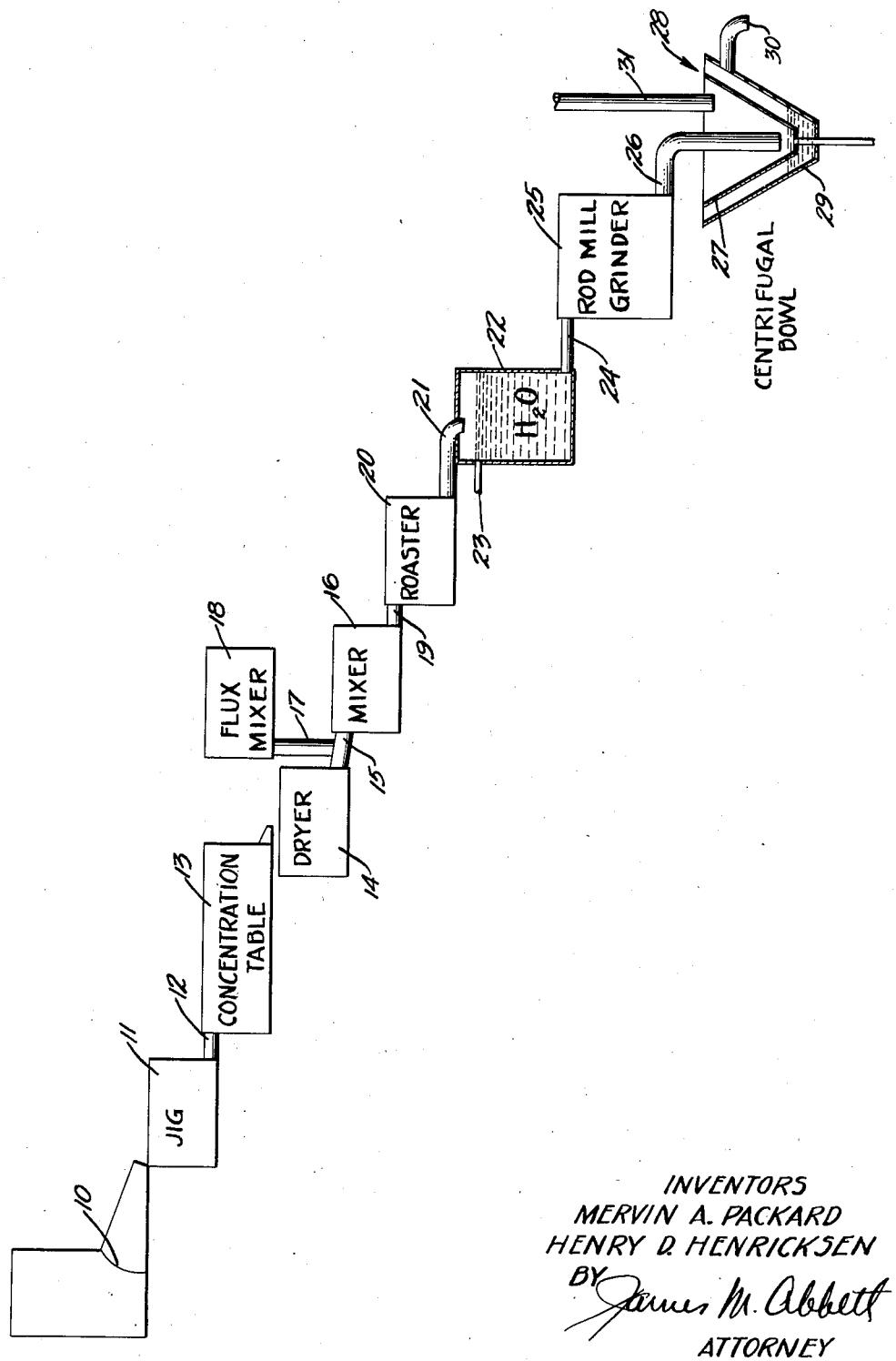
INVENTORS
MERVIN A. PACKARD
HENRY D. HENRICKSEN
BY James M. Abbett
ATTORNEY Patented Apr. 15, 1941

2,238,448

UNITED STATES PATENT OFFICE 2,238,448

METHOD AND MEANS OF RECOVERING METALLIFEROUS VALUES

Mervin A. Packard, Bellflower, and Henry D. Henricksen, Yreka, Calif.

Application July 15, 1939, Serial No. 284,778

7 Claims. (Cl. 75—83)

This invention relates to a metallurgical process and particularly pertains to a method and means of recovering metalliferous values.

In quartz mining operations where precious metals are to be recovered it often occurs that finely divided metal particles are associated with black sand. In such operations various satisfactory means have been provided to recover the larger metal particles but methods for the recovery of the small metal particles associated with the black sand have for the most part been unsatisfactory. It is the principal object of the present invention, therefore, to provide a method and means of treating black sand and the metalliferous particles associated therewith whereby the precious metal may be effectively separated from sand in a simple manner and at a relatively small cost, thus making it possible to recover metal particles from the material within which the particles are associated and which material is at the present time disregarded as a paying source of metal recovery.

The present invention contemplates the provision of apparatus and a method whereby material including black sand and particles of precious metal are treated in the presence of heat and a suitable flux to place the associated material and the metal particles in a chemical condition whereby the particles can be separated by mechanical means and the metal values recovered.

The invention is illustrated by way of example in the accompanying drawing in which the figure is a view showing a flow plan indicating the method by which the invention is practised.

Referring more particularly to the drawing, 10 indicates a storage source for material to be treated in the present process, particularly black sand and gold particles. The concentrates which are stored at 10 are delivered to a jig 11 where classification takes place. Assuming that a bankyard of material is drawn from the source 10 and delivered to the jig and that that amount of concentrate carries approximately 200 pounds of under-current product which is to be treated, the classification in the jig will provide a recovery of from 25 to 50 pounds of desirable concentrates, the rest of the material being rejected. This material is then delivered through a suitable conveying means 12 to a concentrate table 13, where from 3 to 20 pounds of material is retained and the rest rejected. The classified sand and metal particles are then passed to a dryer 14 where the product is thoroughly dried. The dried material is then led through a conveyor 15 to a mixer 16. A conveyor 17 delivers a flux from a flux mixer 18 and the dried concentrates and the flux are thoroughly commingled within the mixer 16. The flux is preferably in a dry condition and includes in proportion one part of iron-oxide to one and one-half parts of aluminum oxide, making approximately three pounds of this mixture of oxides, which is then mixed in approximately 77 pounds of sodium chloride. These are mixed together in the flux mixer 18, after which they are delivered through the conveyor 17 to be mixed with the ore to be treated in the mixer 16. This mixing is done while both the flux and the concentrate are in a dry and powdered form. The mixture of these materials is then led through a conveyor 19 to a roaster 20. The roaster 20 is heated in any suitable manner to a temperature of from 750 to 1500 degrees Fahrenheit. In this roaster a chemical action takes place Aluminum-oxide is used as a flux in the process. Seventy-five pounds of flux is used for each ton of material treated. It has been found that in this use the aluminum-oxide acts more efficiently when combined with iron-oxide and sodium-chloride. The proportions of the flux and material to be treated may preferably be as previously set forth, and when 2000 pounds of black sand is treated the flux as thus proportioned will hasten and complete the reaction by simple roasting. It is well known that aluminum-oxide will break down at high temperature, and since the reaction produces free sulphur this will unite with the aluminum to form aluminum-sulphide. Sodium-chloride has long been known as an oxidizing agent and thus serves a useful purpose in the present reaction. The iron-oxide acts as a catalyzing agent and in the present reaction brings about the desulphurization of the black sand.

The gold which has been carried with the flux and the black sand will be freed from the sand particles in this roasting process, after which the materials from the roaster are delivered through a conveyor 21 to a tank 22. In this tank a continuous supply of water is delivered through a pipe 23, the water being pure and cold. When the highly heated products from the roaster are delivered into the cold water the particles will tend to be disintegrated and reduced in fineness. The particles will then settle in the tank 22 and will be carried with the water through a conveyor 24 to a grinder 25. This grinder is preferably of the rod mill type and again reduces the fineness of the particles. The water and suspended solids are then drawn off through a pipe 26 and fed into the basket 27 of a centrifugal separator 28. As the basket rotates the water and rejected solids are thrown off by the basket and into the bowl 29 from which they are withdrawn in a launder 30. During this operation mercury is delivered to the basket from a suitable source through a pipe 31 and provides an amalgam bath within which the fine metalliferous values are caught. When the amalgam bath has accumulated a sufficient quantity of metalliferous particles the centrifugal separator is stopped and the bath removed so that the particles may be cleaned therefrom.

By the practice of this process gold particles of minute size may be separated from the black sand in an efficient and economical manner, both as to the cost of the treating agent and the labor and fuel. In actual practice it has been found that the cost of the flux at normal market prices will be approximately $3.00 to a ton of material treated, and the fuel and labor cost will be approximately $7.00, making it possible to treat a ton of undercurrent product from placer operations at an expense of $10.00. It will thus be seen that the method here disclosed embodies the use of apparatus easily obtainable upon the market and the use of treating materials which are cheap and easily obtainable, and that furthermore, the invention insures the recovery of materials not at present possible.

While we have shown the preferred method and means of practicing our invention it is understood that various changes might be made in the steps of the method and substitution made for the means disclosed by those skilled in the art without departing from the spirit of the invention as claimed.

Having thus described our invention, what we claim and desire to secure by Letters Patent is:

1. A method of recovering gold particles from a concentrate including black sand which consists in reducing the concentrate to a dry finely powdered state, thereafter mixing a dry powdered flux therewith, said flux comprising aluminum-oxide and sodium-chloride, then roasting the mixture of the concentrate and the flux, thereafter introducing the hot roasted material to a bath of cold water, then separating the metal particles and the associated materials by centrifugal action.

2. A method of recovering gold particles from a concentrate including black sand which consists in reducing the concentrate to a dry finely powdered state, thereafter mixing a dry powdered flux therewith, said flux comprising aluminum-oxide, sodium-chloride and iron-oxide, then roasting the mixture of the concentrate and the flux, thereafter introducing the hot roasted material to a bath of cold water, then separating the metal particles and the associated materials by centrifugal action.

3. A method of recovering gold particles which are associated with black sand, which consists in classifying the particles to concentrate the same, thereafter drying the classified concentrate, then mixing a flux in a dry powdered state with the concentrate, said flux including iron-oxide, aluminum-oxide and sodium-chloride, then roasting the mixture at a temperature of the order of one thousand degrees, thereafter introducing the hot roasted mixture into a bath of cold water, and then separating the gold particles from the mixture by centrifugal action.

4. A method of recovering gold particles which are associated with black sand, which consists in classifying the particles to concentrate the same, thereafter drying the classified concentrate, then mixing a flux in a dry powdered state with the concentrate, said flux including iron-oxide, aluminum-oxide and sodium-chloride, then roasting the mixture at a temperature of the order of one thousand degrees, thereafter introducing the hot roasted mixture into a bath of cold water, then reducing the mixture to a further degree of fineness, and then separating the gold particles from the mixture by centrifugal action.

5. A method of recovering gold particles which are associated with black sand, which consists in classifying the particles to concentrate the same, thereafter drying the classified concentrate, then mixing a flux in a dry powdered state with the concentrate, said flux including iron-oxide, aluminum-oxide and sodium-chloride, then roasting the mixture at a temperature of the order of one thousand degrees, thereafter introducing the hot roasted mixture into a bath of cold water, then reducing the mixture to a further degree of fineness, and then separating the gold particles from the mixture by centrifugal action and recovering the metal particles by amalgamation.

6. A flux for use in the recovery of gold particles from ore bearing material which comprises iron-oxide, aluminum-oxide and sodium-chloride.

7. A flux for use in the recovery of gold particles, black sand or the like, which comprises iron-oxide, aluminum-oxide and sodium-chloride, in the proportion of approximately one part of a mixture of iron-oxide and aluminum-oxide and sixteen parts of sodium chloride.

MERVIN A. PACKARD.
HENRY D. HENRICKSEN.